United States Patent [19]
Forrest

US005087611A

[11] Patent Number: 5,087,611

[45] Date of Patent: Feb. 11, 1992

[54] METHOD OF DRILLING WITH FLUID COMPRISING PEANUT HULLS GROUND TO A POWDER

[76] Inventor: Gabriel T. Forrest, Bering Place II; 800 Bering, Ste. 301, Houston, Tex. 77257

[21] Appl. No.: 724,539

[22] Filed: Jun. 28, 1991

Related U.S. Application Data

[60] Division of Ser. No. 537,169, Jun. 12, 1990, which is a continuation of Ser. No. 233,895, Aug. 15, 1988, abandoned, which is a continuation of Ser. No. 25,995, Mar. 16, 1987, abandoned, which is a continuation-in-part of Ser. No. 831,850, Feb. 24, 1986, abandoned.

[51] Int. Cl.⁵ .............................................. C09K 7/02
[52] U.S. Cl. ...................................... 507/104; 175/72; 252/8.551; 166/283
[58] Field of Search .......................... 175/72; 507/104; 252/8.551; 166/283

[56] References Cited

U.S. PATENT DOCUMENTS

| | | | |
|---|---|---|---|
| 2,351,434 | 6/1944 | Jessen et al. | 252/8.5 |
| 2,815,079 | 12/1957 | Goins, Jr. et al. | 166/29 |
| 2,873,250 | 2/1959 | Scott, Jr. | 252/8.5 |
| 2,943,679 | 7/1960 | Scott, Jr. et al. | 166/21 |
| 3,208,523 | 9/1965 | Coyle et al. | 166/29 |
| 3,217,801 | 11/1965 | Fast et al. | 166/42 |
| 3,574,099 | 4/1971 | Ryals et al. | 252/8.5 |
| 3,629,102 | 12/1971 | Lummus et al. | 252/8.512 |
| 3,788,405 | 1/1974 | Taylor | 175/72 X |
| 4,082,677 | 4/1978 | Zollar et al. | 252/8.5 |
| 4,353,509 | 10/1982 | Bostian, Jr. | 241/24 |
| 4,391,925 | 7/1983 | Mintz et al. | 252/8.512 X |
| 4,397,354 | 8/1983 | Dawson et al. | 252/8.512 X |
| 4,503,170 | 3/1985 | Drake et al. | 252/8.51 X |
| 4,568,392 | 2/1986 | Dawson et al. | 252/8.512 X |

Primary Examiner—John S. Maples
Assistant Examiner—Gary L. Geist
Attorney, Agent, or Firm—Arthur F. Zobal

[57] ABSTRACT

A by-product of peanut growing is utilized in the drilling fluid while drilling boreholes to reduce friction and to reduce the normal adverse effects inherent in such drilling fluid.

7 Claims, No Drawings

METHOD OF DRILLING WITH FLUID COMPRISING PEANUT HULLS GROUND TO A POWDER

This application is a divisional of pending U.S. patent application Ser. No. 07/537,169 filed June 12, 1990, and entitled "Additive For Drilling Fluid", which is a continuation of U.S. patent application Ser. No. 07/233,895, filed on Aug. 15, 1988, now abandoned, which is a continuation of U.S. patent application Ser. No. 07/025,995, filed on Mar. 16, 1987, now abandoned, which is a continuation in part of U.S. patent application Ser. No. 06/831,850, filed on Feb. 24, 1986, now abandoned.

SUMMARY OF THE INVENTION

Peanuts are used extensively for consumption by humans and by animals. A peanut plant provides hulls in which the peanuts are present and such hulls are added selectively to drilling fluid which may be either water-based or oil-based. The hulls are ground to a powder-like material and is added to the drilling fluid in a quantity ranging from one pound to forty pounds per barrel of fluid used in drilling. Adverse chemical effects on the borehole are minimized and friction on the drillpipe also is reduced through the material and method of the present invention. The exact particle size and amount of material will be determined by the applicable well conditions including the type of subterranean formations being drilled.

DETAILED DESCRIPTION

During drilling of wells, drilling fluid or mud is used to circulate and remove foreign matter from the borehole and to allow easier rotation of the drillpipe thereby minimizing power necessary to rotate the drillpipe and allowing faster drilling of the borehole thus requiring use of the drilling rig for a shorter period of time and consequently less expense.

Many drilling fluids have an adverse chemical effect on the formations encountered in drilling thereby providing undesirable chemical reactions in the borehole.

Hulls from peanut plants are ground to a powder material, placed in containers, and hauled to the well site where such material is added to the drilling fluid in a quantity of from about one pound to forty pounds per barrel of drilling fluid. The exact chemical reaction of the drilling fluid additive is not known but increased efficiency in the drilling rate and decreased adverse chemical reaction is provided.

Among the advantages in using the present invention are:

(1) Reduces wall cake permeability
(2) Seals off depleted sands and micro fractures
(3) Prevents seepage loss and stuck pipe
(4) Makes casing and logging run smooth
(5) Bio degradable and non-toxic
(6) Temperature is stable
(7) Reduces bit balling, drag, and torque
(8) Reduces shale and gumbo problems The present invention does not utilize peanuts or peanut skins and is used underground and not on the surface of the earth.

Thus, the present invention provides a compound, method, and system for improving drilling fluid.

Although a preferred embodiment of the invention has been described, it will be appreciated by those skilled in the art to which the present invention pertains that modifications, changes, and improvements may be made without departing from the spirit of the invention defined by the claims.

I claim:

1. A method of carrying out oil well drilling operations wherein a drilling fluid is circulated in a well being drilled in the ground comprising the steps of:
    taking peanut hulls and grinding said peanut hulls to a powder form,
    adding said ground peanut hulls to a drilling fluid, and
    circulating said drilling fluid, with said ground peanut hulls added thereto, in said well while drilling operations are being carried out.

2. The method of claim 1, wherein:
    said ground peanut hulls are added to said drilling fluid in an amount of at least one pound per barrel of drilling fluid.

3. The method of claim 2, wherein said ground peanut hulls are added to said drilling fluid in an amount from about one pound to about forty pounds per barrel of drilling fluid.

4. A method of carrying out oil well drilling operations wherein a drilling fluid is circulated in a well being drilled in the ground, comprising the steps of:
    taking peanut hulls which have been ground to a powder form,
    adding said peanut hulls ground to a powder form, to a drilling fluid, and
    circulating said drilling fluid, with said ground peanut hulls added thereto, in said well.

5. The method of claim 4, wherein said ground peanut hulls are added to said drilling fluid in an amount of at least one pound per barrel of drilling fluid.

6. The method of claim 4, wherein said ground peanut hulls are added to said drilling fluid in an amount from about one pound to about forty pounds per barrel of drilling fluid.

7. A method of carrying out operations wherein a fluid is circulated in a well extending into the ground, comprising the steps of:
    taking peanut hulls which have been ground to a powder form,
    adding said ground peanut hulls to a fluid, and
    circulating said fluid, with said ground peanut hulls added thereto, in said well.

* * * * *